(12) United States Patent
Elliott et al.

(10) Patent No.: US 8,704,144 B2
(45) Date of Patent: Apr. 22, 2014

(54) DUAL SPEED READOUT INTEGRATED CIRCUIT FOR HIGH SPATIAL AND TEMPORAL RESOLUTION APPLICATIONS

(75) Inventors: James M. Elliott, Santa Maria, CA (US); Mark Alan Massie, Santa Ynez, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 79 days.

(21) Appl. No.: 13/282,762

(22) Filed: Oct. 27, 2011

(65) Prior Publication Data

US 2012/0104231 A1    May 3, 2012

Related U.S. Application Data

(60) Provisional application No. 61/407,322, filed on Oct. 27, 2010.

(51) Int. Cl.
*H01L 27/00* (2006.01)
*H04N 5/335* (2011.01)

(52) U.S. Cl.
USPC ............ 250/208.1; 250/214 R; 250/214 SW; 348/302; 348/294

(58) Field of Classification Search
USPC ................... 250/208.1, 214 R, 214 SW; 348/294–298, 300–302; 382/68; 257/290–298
See application file for complete search history.

(56) References Cited

U.S. PATENT DOCUMENTS

| | | | |
|---|---|---|---|
| 5,949,483 A * | 9/1999 | Fossum et al. | 348/303 |
| 6,040,568 A * | 3/2000 | Caulfield et al. | 250/208.1 |
| 6,693,670 B1 * | 2/2004 | Stark | 348/308 |
| 6,885,002 B1 * | 4/2005 | Finch et al. | 250/332 |
| 7,515,183 B2 * | 4/2009 | Yang et al. | 348/241 |
| 7,551,059 B2 * | 6/2009 | Farrier | 340/300 |
| 7,808,528 B2 * | 10/2010 | Massie et al. | 348/208.14 |
| 8,120,687 B2 * | 2/2012 | Nishino et al. | 348/308 |
| 2009/0066782 A1 * | 3/2009 | Choi et al. | 348/25 |

* cited by examiner

*Primary Examiner* — Que T Le
*Assistant Examiner* — Carolynn Moore
(74) *Attorney, Agent, or Firm* — Felix L. Fischer

(57) ABSTRACT

A dual speed Read-Out Integrated Circuit employs a native pixel array with associated high resolution integration circuits for each pixel and a superpixel array created within the native pixel array by combination of native pixels for charge sharing integration in reduced resolution integration circuits simultaneously with the integration of the high resolution integration circuits. Switching control for readout of the high resolution integration circuits is accomplished at a first frame rate and switching control for readout of the reduced resolution integration circuits is accomplished at a second higher frame rate.

7 Claims, 3 Drawing Sheets

DUAL SPEED READOUT INTEGRATED CIRCUIT FOR HIGH SPATIAL AND TEMPORAL RESOLUTION APPLICATIONS

REFERENCE TO RELATED APPLICATIONS

This application claims the priority of US provisional application Ser. No. 61/407,322 filed on Oct. 27, 2010 entitled DUAL SPEED READOUT INTEGRATED CIRCUIT FOR HIGH SPATIAL AND TEMPORAL RESOLUTION APPLICATIONS, the disclosure of which is incorporated herein by reference.

STATEMENT REGARDING FEDERALLY SPONSORED RESEARCH OR DEVELOPMENT

This invention was made with Government support under FA8650-11-M-1084 awarded by the Air Force. The Government has certain rights in the invention.

BACKGROUND INFORMATION

1. Field

Embodiments of the disclosure relate generally to the field of read-out integrated circuits (ROIC) for infrared sensors and more particularly to embodiments for a ROIC device that provides a single photodiode device in each of an array of unit cells having switched capacitor circuitry within the unit cell architecture used to produce a reduced resolution output (e.g. 512×512 "superpixels") at a frame rate of approximately 1000 Hz or greater to capture hostile fire image events (a "Temporal Mode") while simultaneously producing a high resolution output (1280×1024 or larger pixel format of native pixels) at a 60 Hz video rate to provide high resolution imaging surveillance capability (an "Imaging Mode").

2. Background

Infrared detection and imaging systems are being employed to sense temperature differences to create scenes displaying various objects. High resolution imagers provide exceptional acuity for scene reproduction. However, due to lower frame rates required to read out the full array of detectors, this may not provide sufficient near real time sensing of certain imaging needs such as hostile fire indications. Many such threats have distinctive high contrast image features which allow imaging at reduced resolution and much higher frame rates.

It is therefore desirable to provide ROIC arrays which simultaneously operate in an "Imaging Mode" (i.e., for high spatial resolution imaging applications) as well as a "Temporal Mode" (i.e., for high frame rate hostile fire detection applications).

SUMMARY

Exemplary embodiments provide a dual speed Read-Out Integrated Circuit with a native pixel array with associated high resolution integration circuits for each pixel and a superpixel array created within the native pixel array by combination of native pixels for charge sharing integration in reduced resolution integration circuits simultaneously with the integration of the high resolution integration circuits. Switching control for readout of the high resolution integration circuits is accomplished at a first frame rate and switching control for readout of the reduced resolution integration circuits is accomplished at a second higher frame rate.

For exemplary embodiments, the superpixel array provides charge sharing in 4×4 native pixel regions for integration in the reduced resolution integration circuit. The second frame rate being about 1000 Hz produces high speed for HFI sensing. Simultaneously, the first frame rate for the native pixel array is about 60 Hz producing high resolution video surveillance imaging capability.

The features, functions, and advantages that have been discussed can be achieved independently in various embodiments of the present invention or may be combined in yet other embodiments further details of which can be seen with reference to the following description and drawings

DETAILED DESCRIPTION

Figure 1:
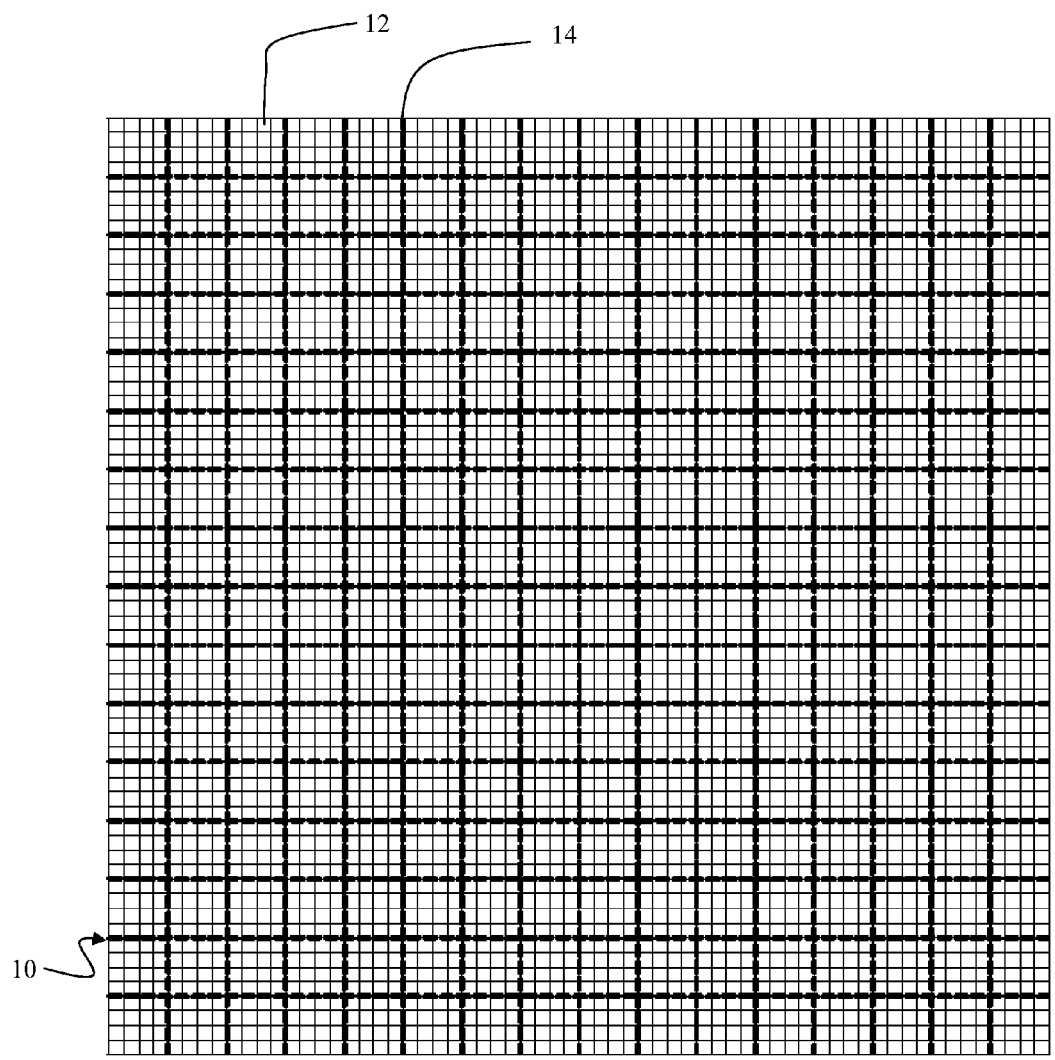
FIG. 1 is a schematic representation of a dual mode native pixel/super pixel imaging array employed in present embodiments.

The embodiments described herein provide an imaging array having a focal plane array (FPA) 10 of 1280×1024, or larger, native pixels with superpixels created by a 4×4 pixel charge averaging technique. As shown in FIG. 1 for a generalized array having 2048×2048 individual native pixels 12 in the array employed for a high resolution or imaging mode which is sampled at a 60 Hz frame rate. Combining integration of subsets of native pixels or superpixels 14, for the embodiment described herein, 4×4 native pixels provides a 512×512 superpixel array, which allows sampling at 1000 Hz or greater for a reduced resolution high speed or temporal mode. Simultaneously, a switched capacitor network within each pixel, to be described subsequently, performs a charge averaging operation that produces the reduced resolution (e.g., 512×512 superpixels) "Temporal Mode" image that is sampled at approximately 1000 Hz frame rate and produces a high resolution (e.g., 2048×2048 pixel) "Imaging Mode" image that is sampled at a 60 Hz frame rate for high quality video rate surveillance applications. For exemplary embodiments using analog output channels, the array employs InSb detectors with a 20 um pitch and at least six parallel output channels to accommodate the 2048×2048 native pixel imaging mode and at least four parallel output channels for the 512×512 superpixel temporal mode. Output channels may be either analog or digital in various embodiments.

Figure 2:
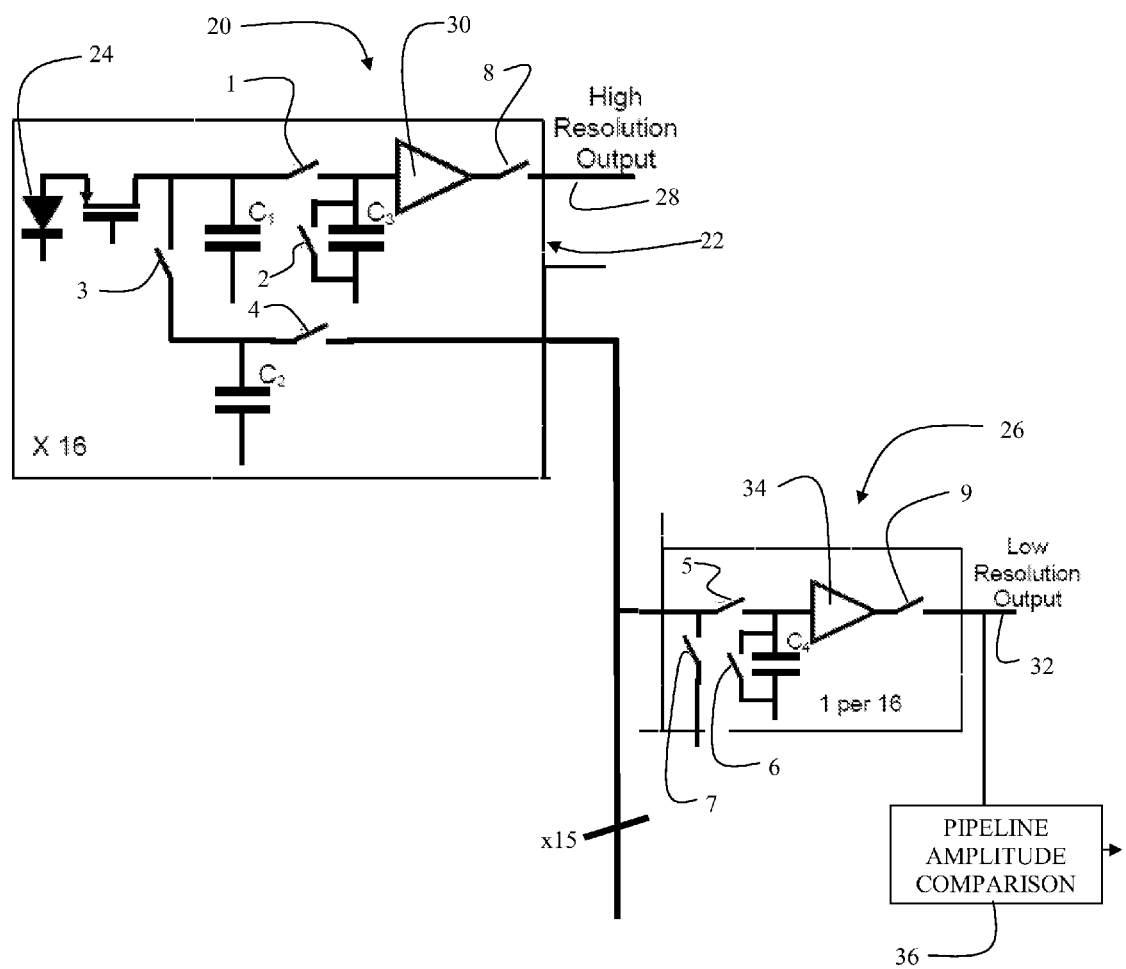
FIG. 2 is a schematic diagram of the integration circuits for both the native pixels and superpixels of the array; and, FIG. 3 is a timing diagram for operation of the control switching for the integration circuits.

FIG. 2 shows a unit cell 20 with individual native high resolution integration circuits 22 associated with each detector 24. A reduced resolution integration circuit 26 is associated with a superpixel in the reduced resolution array, 16 native detectors (4×4 unit cells) for the embodiment shown. The high resolution unit cell is basically a standard direct injection unit cell with the exception that the integration capacitor is divided into a first integration capacitor C1 and a second integration capacitor C2, which can be independently sampled. This allows the reduced resolution sample to have the same transfer characteristic regardless of whether the high resolution sample is acquired during that reduced resolution frame or not. If a slightly lower gain every sixteen frames can be tolerated, then 16 switches can be removed from a 4×4 unit cell region for space savings.

The integration reset switch 7 is common to sixteen high resolution unit cells. In alternative embodiments, switch 7 may be moved to C1 if there is an advantage to do so. The shown present location for the embodiment of FIG. 2 has the advantage of reducing the number of components as well as routing lines.

The high resolution sample and hold switch 1 connecting sample and hold capacitor C3 to the first integrating capacitor C1 and the corresponding sample and hold reset switch 2 are only operated once per high resolution frame (60 Hz) to produce data on high resolution output 28 through amplifier 30 when sampled by switch 8. Switch 3 and the aggregation switch 4 in each unit cell with the low resolution sample and hold switch 5 connecting a second sample and hold capacitor C4 to the second integrating capacitor C2, the corresponding second sample and hold reset switch 6, and the integration reset switch 7 operate sixteen times per high resolution frame providing data on low resolution output 32 through amplifier 34 when sampled by switch 9. Thus, there are 16 reduced resolution frames per high resolution frame.

The high speed sampling of the reduced resolution superpixels allows additional analysis of the data in the temporal mode such as signal amplitude comparison 36 for identifying high contrast sources detected by individual superpixels. Hostile fire indicating (HFI) can be accomplished by determining the presence of high contrast signals in individual superpixels as the data is received.

Figure 3:
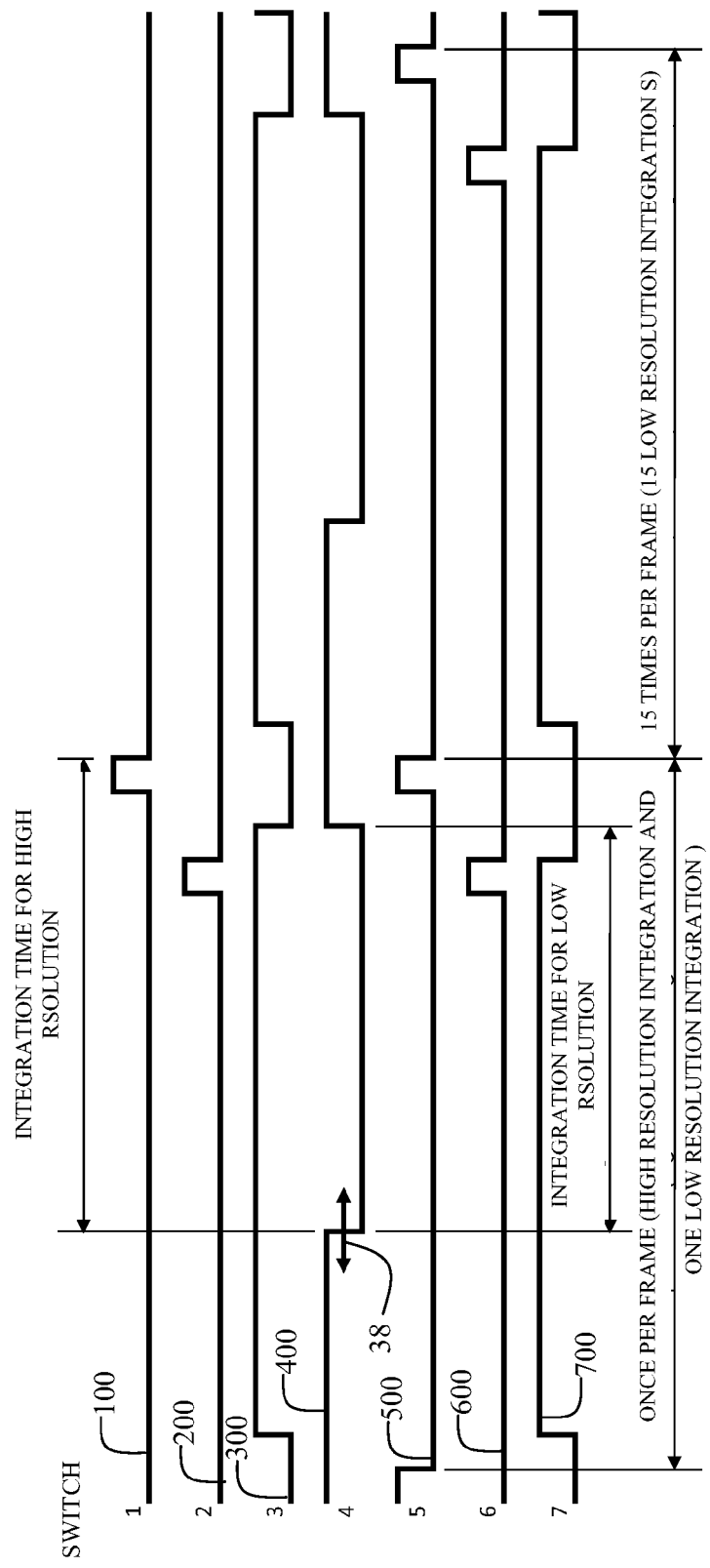

In one embodiment, the unit cell timing is shown in FIG. 3. This timing diagram does not show the multiplexing of the sampled data out of the unit cell. This will occur when the data is held on the respective sample and hold capacitors (the majority of their respective frame times). Four reduced resolution rows will be read out for every high resolution row. Since they are composed of the aggregation of four rows, the entire array in reduced resolution mode (4×4 aggregation) will be read out sixteen times as fast as the high resolution mode.

As shown in FIG. 3 with traces 100, 200, 300, 400, 500, 600 and 700 shown for each respective switch 1, 2, 3, 4, 5, 6 and 7 (high closed, low open), the unit cell read out starts after the data is sampled and held. While this is occurring, the integration node is reset (capacitors C1 and C2) through switches 3, 4, and 7. Integration begins when switch 4 is opened. This edge is variable with respect to the fixed sample and hold times as represented by arrow 38 and is used to adjust the integration times. Integration stops for the high resolution mode when switch 1 is opened. Before this occurs, the second integration capacitor C2 is removed from the integration node by opening switch 3 to isolate it for the reduced resolution sampling and sample and hold capacitor C3 is reset with switch 2 to clear out the previous sample. Integration stops for the reduced resolution mode when switch 3 is opened isolating C2 from the integration node. Next, the second sample and hold capacitor C4 that was recently reset with switch 6 to clear out the previous sample is connected to C2 in each of the unit cells in the superpixel by switches 4 and switch 5 to sample its portion of the integrated charge.

In an exemplary embodiment; the six parallel output channels each operate at ≥16.4 MHz sample rate for Imaging Mode and four separate parallel output channels operate at ≥16.4 MHz sample rate for Temporal Mode. Approximately 1000 Hz frame rate is achieved for Temporal Mode sensing while a 60 Hz frame rate provides high spatial resolution Midwave Infra-Red (MWIR) video imaging. The InSb photovoltaic detector diode array is employed for MWIR response and is extremely sensitive to hot $CO_2$ emission of muzzle flash for hostile fire indicating (HFI) capability in the temporal mode while being effective for day/night operation.

While described for an exemplary embodiment as a 2048× 2048 array, the dual speed readout array may be larger in alternative embodiments. An array of 3088×2064 native pixels may be employed with sixteen extra columns and sixteen extra rows for timing overhead and design margin. The largest data frames for this array are 3088×2064 pixels at 60 Hz and 772×516 aggregated pixels at 960 Hz for the 3072×2048 high resolution image and 768×512 reduced resolution (4×4 aggregation superpixels) image respectively. The maximum line rates are 124 kHz and 495 kHz respectively. The maximum pixel rates are 382 MHz in both cases.

A minimum line time of 2 us is achievable as well as parallel processing of aggregated pixel rows to lower the unit cell read out line rate. This would allow smaller windows in the column direction as well as power/noise performance improvements. The output buffer data rate is limited to about 20 MHz. It is usually advantageous to use an even number of output buffers when handling the data in a raster scan fashion with windowing capability to simplify the timing. This would require 20 output buffers running at 19.2 MHz for each mode. Table 1 shows the high resolution and the reduced resolution frame rates for several possible array sizes. Sixteen columns and sixteen rows have been added for timing overhead. The output data rate is the same for both resolutions to keep clock edges coincident when processing analog data.

TABLE 1

| | High Resolution | | | Low Resolution | | |
|---|---|---|---|---|---|---|
| Array Size | Frame Rate | Line Time | Outputs | Frame Rate | Line Time | Outputs |
| 3072 × 2048 | 60.2 Hz | 8 us | 20 @ 19.2 MHz | 964 Hz | 2 us | 20 @ 19.2 MHz |
| 3072 × 2048 | 62.8 Hz | 7.7 us | 20 @ 20 MHz | 502.1 Hz | 3.9 us | 10 @ 20 MHz |
| 2048 × 2048 | 60.5 Hz | 8 us | 14 @ 18.4 MHz | 967.5 Hz | 2 us | 14 @ 18.4 MHz |
| 2048 × 2048 | 60.5 Hz | 8 us | 14 @ 18.4 MHz | 552.9 Hz | 3.5 us | 8 @ 18.4 MHz |
| 1536 × 1024 | 61 Hz | 15.8 us | 6 @ 16.4 MHz | 975.4 Hz | 3.9 us | 6 @ 16.4 MHz |
| 1536 × 1024 | 61 Hz | 15.8 us | 6 @ 16.4 MHz | 650.3 Hz | 5.9 us | 4 @ 16.4 MHz |
| 1024 × 1024 | 60.7 Hz | 15.9 us | 4 @ 16.4 MHz | 970.4 Hz | 4 us | 4 @ 16.4 MHz |
| 1024 × 1024 | 62.9 Hz | 15.3 us | 4 @ 17 MHz | 503 Hz | 7.6 us | 2 @ 17 MHz |
| 512 × 512 | 61 Hz | 31.1 us | 1 @ 17 MHz | 975.7 Hz | 7.8 us | 1 @ 17 MHz |

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:
1. A dual speed readout integrated circuit comprising:
   a native pixel array with associated high resolution integration circuits for each pixel wherein each native pixel in the native pixel array comprises:
   a detector;

a first integration capacitor connected to the detector and a second integration capacitor connected to the detector; and, a sample and hold capacitor selectably connectable to the first integration capacitor;

a superpixel array created from the entire native pixel array by combination of native pixels in superpixels for charge sharing integration in reduced resolution integration circuits simultaneously with the integration of the high resolution integration circuits wherein each superpixel in the superpixel array includes a second sample and hold capacitor selectively connectable to the second integration capacitor in each native pixel combined for the superpixel;

switching control for readout of the high resolution integration circuits at a first frame rate; and switching control for readout of the reduced resolution integration circuits at a second frame rate.

2. The dual speed readout integrated circuit as defined in claim 1 wherein connection of the sample and hold capacitor to the first integration capacitor is accomplished by a first switch operating one time per frame and connection of the second sample and hold capacitor to the second integration capacitor in each native pixel is accomplished by a second switch operating 16 times per frame.

3. A method for dual speed readout in an infrared sensor readout integrated circuit comprising:

resetting a first and a second integration capacitor in each unit cell of an array of unit cells;

beginning integration;

isolating the second integration capacitor;

resetting a first sample and hold capacitor;

resetting a second sample and hold capacitor associated with a superpixel of a plurality of unit cells in the unit cell array;

connecting the second sample and hold capacitor to the second integration capacitor in each of the unit cells in the superpixel and reading the second sample and hold capacitor at a first sample rate; and, connecting the first sample and hold capacitor to the first integration capacitor and reading the first sample and hold capacitor at a second sample rate.

4. The method of claim 3 wherein the superpixel comprises at least a 4×4 matrix of unit cells.

5. The method of claim 4 wherein the array of unit cells comprises at least 1280×1024 unit cells.

6. The method of claim 3 wherein the second sample rate comprises once per frame.

7. The method of claim 6 wherein the first sample rate comprises 16 times per frame.

* * * * *